(12) United States Patent
Tang

(10) Patent No.: US 11,483,285 B2
(45) Date of Patent: Oct. 25, 2022

(54) ACCESS CONTROL DEVICE, AN ACCESS CONTROL METHOD, A COMPUTER PROGRAM PRODUCT AND A COMPUTER READABLE MEDIUM

(71) Applicant: Siemens Aktiengesellschaft, Munich (DE)

(72) Inventor: Wen Tang, Beijing (CN)

(73) Assignee: Siemens Aktiengesellschaft, Munich (DE)

( * ) Notice: Subject to any disclaimer, the term of this patent is extended or adjusted under 35 U.S.C. 154(b) by 316 days.

(21) Appl. No.: 16/454,288

(22) Filed: Jun. 27, 2019

(65) Prior Publication Data

US 2020/0007498 A1    Jan. 2, 2020

(30) Foreign Application Priority Data

Jun. 29, 2018 (CN) .......................... 201810712455.4

(51) Int. Cl.
*H04L 29/06* (2006.01)
*H04L 9/40* (2022.01)

(52) U.S. Cl.
CPC .......... *H04L 63/0236* (2013.01); *H04L 63/10* (2013.01); *H04L 63/20* (2013.01)

(58) Field of Classification Search
CPC ..... H04L 63/0236; H04L 63/10; H04L 63/20; H04L 63/164; H04L 63/166
(Continued)

(56) References Cited

U.S. PATENT DOCUMENTS

2007/0199061 A1    8/2007   Byres et al.
2013/0219493 A1*   8/2013   Banzhof ............... G06F 21/566
                                                             726/22
(Continued)

FOREIGN PATENT DOCUMENTS

CN     102377740 A     3/2012
CN     103491108 A     1/2014
(Continued)

OTHER PUBLICATIONS

Extended European Search Report dated Nov. 20, 2019.
(Continued)

*Primary Examiner* — Longbit Chai
(74) *Attorney, Agent, or Firm* — Harness, Dickey & Pierce, P.L.C.

(57) ABSTRACT

An access control device provides a secure access control mechanism for a system being remotely accessed. An embodiment of the access control device includes a front-end firewall to provide a first network port to connect a computer to remotely access the system; a bastion host connected with the front-end firewall; and a back-end firewall, connected with the bastion host, to provide a second network port to connect the system. The back-end firewall determines remotely accessible resources in the system and determines resources remotely accessible by the computer, among the remotely accessible resources in the system, according to remote access control policies. The bastion host provides the computer with information provided by the back-end firewall about the resources remotely accessible by the computer through the first network port of the front-end firewall, to permit the resources to be remotely accessible by the computer. Advantages may include security, simplicity and plug-and-play.

22 Claims, 4 Drawing Sheets

(58) Field of Classification Search
USPC .......................................................... 726/1
See application file for complete search history.

(56) References Cited

U.S. PATENT DOCUMENTS

| | | | |
|---|---|---|---|
| 2016/0277416 A1 | 9/2016 | Brandt et al. | |
| 2016/0323291 A1 | 11/2016 | Stuntebeck | |
| 2018/0027071 A1* | 1/2018 | Toepke | ................... H04L 67/12 |
| | | | 709/217 |

FOREIGN PATENT DOCUMENTS

| | | | |
|---|---|---|---|
| DE | 1020-0902-2977 | * | 12/2010 |
| DE | 102009022977 A1 | | 12/2010 |
| WO | WO 2007038872 A1 | | 4/2007 |

OTHER PUBLICATIONS

European Office Action dated Nov. 27, 2020.
First Office Action dated Jun. 3, 2021 in Chinese Application No. 201810712455.4.

* cited by examiner

ACCESS CONTROL DEVICE, AN ACCESS CONTROL METHOD, A COMPUTER PROGRAM PRODUCT AND A COMPUTER READABLE MEDIUM

PRIORITY STATEMENT

The present application hereby claims priority under 35 U.S.C. § 119 to China patent application number CN 201810712455.4 filed Jun. 29, 2018, the entire contents of which are hereby incorporated herein by reference.

FIELD

Embodiments of the invention generally relate to the technical field of industrial security, and in particular relate to an access control device, an access control method, a computer program product and a computer readable medium.

BACKGROUND

According to the definition provided by Gartner, the operational technology (OT) integrates hardware and software and detects or triggers the change of a process or an event in an enterprise by directly monitoring and/or controlling a physical device. The OT utilizes a computer to monitor or change the physical state of, for example, an industrial control system (ICS), wherein the industrial control system is a facility, system or device realized based on a computer and is used to remotely monitor and/or control critical industrial processes to realize physical functions. The term "OT" is used to distinguish the industrial control system from the traditional information technology (IT) system in terms of technical realization and function. A system for which the OT is adopted can comprise:

a supervisory control and data acquisition (SCADA) system, a distributed control system (DCS)

a computer numerical control (CNC) system, including computerized machine tools, and scientific equipment (for example, digital oscilloscope).

A traditional OT system is a closed system. The productivity, operability and reliability are mainly considered, but the security is seldom emphasized at the beginning of design. These systems depend on a dedicated network and hardware and are always considered defendable against network attacks. With the evolution of the automatic manufacturing technology and the process control technology, the demand for protecting the ICS/OT computer environment increases year by year, however. As the IT is widely used, the traditional closed system gradually evolves towards an open system. The emergence of various business models such as joint venture and service outsourcing enables the traditional enclosed system to be connected with an external system, and the rapid increase of network intrusion events and the use of malicious software also further increase the risk of the ICS being externally attacked. All these make it urgent to protect the network security of the OT system.

On the other hand, most production equipment in the OT system is provided by other companies. In view of the complexity of the equipment, the owner of the equipment may be unable to diagnose equipment failures or maintain the equipment, and needs to rely on the technical support provided by the equipment supplier in most cases. To avoid a high on-site support expense, most operators of OT systems allow the equipment supplier to provide remote technical support by accessing OT systems over the Internet. In this way, OT systems are connected with external systems. If no effective security protection measures are taken, it is very likely that the OT systems may face the following network security threats:

critical and vulnerable OT systems or equipment may accept an unauthorized access or even may suffer Internet attacks;

if computers which remotely access OT systems are infected with viruses, the viruses may infect the equipment in the OT systems when engineers perform remote maintenance for the OT systems;

communication between computers which remotely access OT systems and the OT systems may be wiretapped and may suffer a man-in-the-middle (MITM) attack.

SUMMARY

Therefore, the inventors have discovered that how to adopt effective secure protection measures during remote accesses to OT systems to improve the security of the OT systems is a problem that needs to be solved urgently.

In view of this, at least one embodiment of the present invention provides an access control device and an access control method, which can be applied during remote access to a system to provide an effective secure protection method. With the practical requirements of the system operator fully considered, the device and the method have the advantages of ease-of-use and plug-and-play and effectively lower the security risks of the system. The device and the method can not only be applied to an OT system, but also can provide secure protection measures during a remote access to an IT system.

In the first embodiment, an access control device is provided and is used to provide a secure access control mechanism for a system when the system is remotely accessed. The device comprises:

a front-end firewall being configured to provide a first network port, the first network port being configured to connect a computer to remotely access the system;

a bastion host connected with the front-end firewall; and a back-end firewall, connected with the bastion host, to provide a second network port, the second network port being configured to connect the system, the back-end firewall being configured to determine, through the second network port, remotely accessible resources in the system and to determine resources remotely accessible by the computer, among the remotely accessible resources in the system, according to remote access control policies, and the bastion host being configured to provide the computer with information provided by the back-end firewall about the resources remotely accessible by the computer through the first network port of the front-end firewall, to permit the resources to be remotely accessible by the computer.

In a second embodiment, an access control method is provided and is used to provide a secure access control mechanism for a system when the system is remotely accessed. The access control method comprises:

determining via the access control device, connected between the system and a computer to remotely access the system, remotely accessible resources in the system;

determining, via the access control device, the resources remotely accessible by the computer, among the remotely accessible resources in the system, according to the remote access control policies; and providing for the computer, via the access control device, information about the resources remotely accessible by the computer, to permit the resources to be remotely accessible by the computer.

In the third embodiment, an access control device is provided and comprises at least one storage used to store computer readable codes and at least one processor used to invoke the computer readable codes to execute the method in the second embodiment.

In the fourth embodiment, a computer program product is provided, the computer program product is tangibly stored in a computer readable medium and comprises computer executable instructions, and at least one processor executes the method in the second embodiment when the computer executable instructions are executed.

In the fifth embodiment, a computer readable medium is provided, computer readable instructions are stored in the computer readable medium, and a processor executes the method in the second embodiment when the computer readable instructions are executed by the processor.

Figure 1:
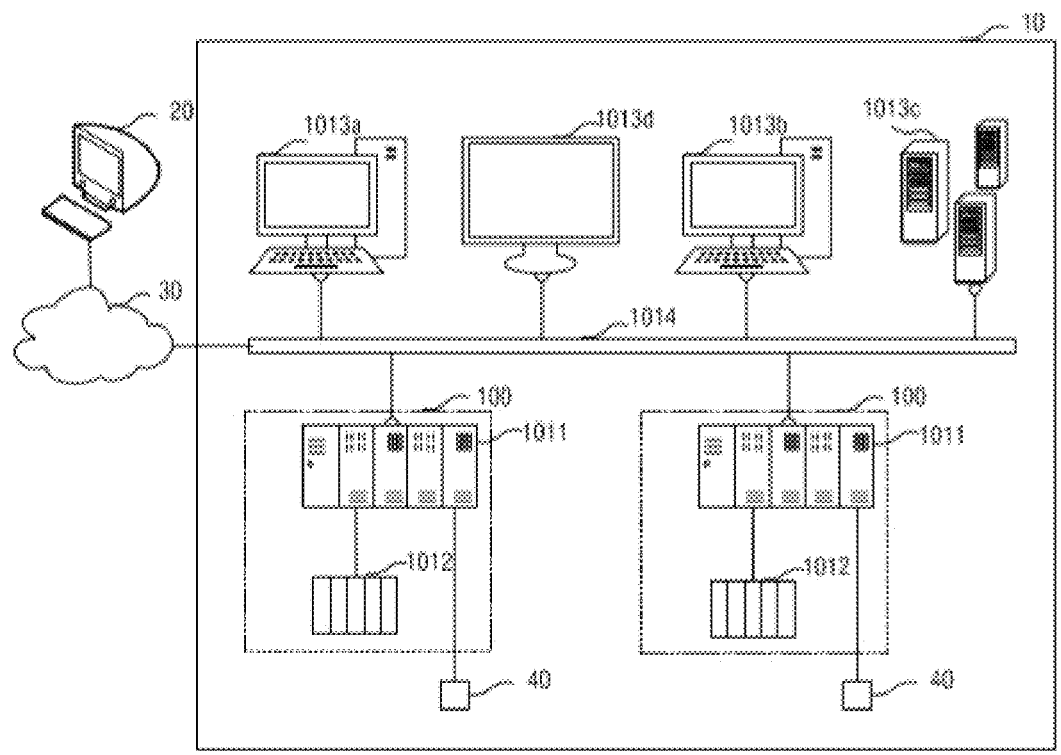
FIG. 1 shows a way of remotely accessing an OT system and the composition of the OT system.

Description of reference numerals in the drawings:

| | | |
|---|---|---|
| 10: Remotely accessed system | 20: Computer to remotely access the system 10 | 50: Access control device |
| 1011: Industrial controller | 1012: Distributed input/output device | 1013a: Engineer station |
| 1013b: Operator station | 1013c: Server | 1013d: Human machine interface |
| 1014: Industrial Ethernet | 40: Field equipment | 100: Control unit |
| 501: Front-end firewall | 502: Bastion host | 503: Back-end firewall |
| 504: Management module | 505: Auditing module | |
| 506: Storage | 507: Processor | |
| 51: First network port | 52: Second network port | 53: Third network port |
| 54: Internal network port of front-end firewall 501 | | |
| 55: Management port of front-end firewall 501 | | |
| 56: Input port of bastion host 502 | 57: Output port of bastion host 502 | |
| 58: Management port of bastion host 502 | 59: Internal network port of back-end firewall 503 | |
| 60: Management port of back-end firewall 503 | | |
| S401: Network connection and equipment power-on | | |
| S402: The management module 504 configures remote access control policies for the front-end firewall 501 | | |
| S403: The management module 504 configures remote access control policies for the bastion host 502 | | |
| S404: The management module 504 configures remote access control policies for the back-end firewall 503 | | |
| S4041: The back-end firewall 503 automatically determines the remotely accessible resources in the system 10 and provides them for the management module 504 | | |
| S4042: The management module 504 provides the information about the remotely accessible resources determined by the back-end firewall 503 in the system 10 for the manager of the system 10 | | |
| S4043: The management module 504 receives a configuration command from the manager of the system 10 | | |
| S4044: The management module 504 configures remote access control policies for various resources according to the configuration command | | |
| S4045: The management module 504 configures remote access control policies for various resources according to the preset configuration rules | | |
| S405: The front-end firewall 501 receives a remote access request from the computer 20 | | |
| S406: The front-end firewall 501 controls the remote access of the computer 20 to the system 10 according to the configured remote access control policies (for example, controls the access of the computer 20 according to the IP address and/or port No. of the computer 20) | | |
| S407: The bastion host 502 controls the remote access of the computer 20 to the system 10 according to the configured remote access control policies (for example, performs user authentication for the computer 20 and provides a remote desktop for the access of the computer 20 to the system 10) | | |
| S408: The back-end firewall 503 determines the resources which the computer 20 can remotely access according to the configured remote access control policies | | |
| S409: The bastion host 502 displays the resources which the computer 20 can remotely access on the remote desktop and realizes the communication with the computer 20 through the front-end firewall 501 | | |
| S410: The bastion host 502 receives a request for a remote access to the resources in the system 10 on the remote desktop from the computer 20 and sends the information about the remote access to the back-end firewall 503 | | |
| S411: The back-end firewall 503 controls the remote access of the computer 20 according to the remote access control policies for the resources which the computer 20 remotely accesses, and sends the result of the remote access of the computer 20 to the bastion host 502 | | |
| S412: The bastion host 502 displays the result of the remote access to the computer 20 on the remote desktop and realizes the communication with the computer 20 through the front-end firewall 501 | | |
| S413: The auditing module 505 audits the front-end firewall 501, the back-end firewall 503 and the bastion host 502 | | |

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

To let those skilled in the art better understand the technical solution of the present invention, the following will clearly and completely describe the technical solution in the embodiments of the present invention in combination with the drawings in the embodiments of the present invention. Obviously, the embodiments described are only a part, but not all of the embodiments of the present invention. All other embodiments obtained by those skilled in the art on the basis of the embodiments of the present invention without any creative work should fall within the scope of protection of the present invention.

It should be noted that the terms "first" and "second" in the description, claims and the drawings are used to distinguish between similar objects, but not necessarily used to describe a specific order or sequence. These terms are only used to distinguish one element from another. It should be understood that the data used in such a way can be interchanged as appropriate so that the described embodiments of the present invention can be implemented in an order other than that shown or described here. As used herein, the term "and/or," includes any and all combinations of one or more of the associated listed items. The phrase "at least one of" has the same meaning as "and/or". In addition, the terms "comprise" and "have" and their variants are intended to cover non-exclusive inclusions. For example, the process or method comprising a series of steps or the system, product or equipment comprising a series of modules or units are unnecessarily limited to those clearly-listed steps or modules or units, but can comprise other steps or modules or units which are not clearly listed or are intrinsic to the process, method, product or equipment.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Most of the aforementioned components, in particular the identification unit, can be implemented in full or in part in the form of software modules in a processor of a suitable control device or of a processing system. An implementation largely in software has the advantage that even control devices and/or processing systems already in use can be easily upgraded by a software update in order to work in the manner according to at least one embodiment of the invention.

In the first embodiment, an access control device is provided and is used to provide a secure access control mechanism for a system when the system is remotely accessed. The device can comprise a front-end firewall providing a first network port, the first network port being used to connect a computer to remotely access the system, a bastion host connected with the front-end firewall, and a back-end firewall connected with the bastion host and providing a second network port, the second network port being used to connect the system, the back-end firewall being used to determine through the second network port the remotely accessible resources in the system and determine the resources which the computer can remotely access among the remotely accessible resources in the system according to the preconfigured remote access control policies, wherein the bastion host is used to provide the computer with information provided by the back-end firewall about the resources the computer can remotely access through the first network port of the front-end firewall so that the computer can remotely access the resources.

The functions of the firewalls and the bastion host are integrated into an access control device. The access control device has the advantages of plug-and-play and ease-of-use, effectively lowers the cost and effectively reduces the complexity of remote diagnoses and maintenance while the remote access security is guaranteed. The remote access device can effectively prevent critical equipment, for example, industrial controller and insecure and vulnerable equipment, in the system from being exposed to the Internet. The front-end firewall in the access control device can prevent unauthorized accesses, and the back-end firewall can determine the remotely accessible resources in the system and allow a remote computer to access the designated resources in the system according to the preconfigured policies.

Alternatively, the access control device can further comprise a management module connected with the back-end firewall, wherein the management module provides a third network port and the third network port is used to interact with the manager of the system.

In an alternative realization mode, the management module is used to provide the manager of the system with information about the remotely accessible resources in the system through the third network port, receive a configuration command from the manager of the system through the third network port, the configuration command being used to configure remote access control policies for the remotely accessible resources in the system, and configure remote access control policies for the remotely accessible resources in the system according to the received configuration command.

Furthermore, the manager of the system can configure remote access control policies in advance. In this way, the plug-and-play feature of the access control device is further guaranteed. After the access control device is deployed, effective security protection can be realized for the system according to the preconfigured remote access control policies.

In an alternative realization mode, the management module is used to configure remote access control policies for the remotely accessible resources in the system according to the preset configuration rules.

In this way, the configuration difficulty of the access control device is further lowered.

Alternatively, the system is an OT system, and the back-end firewall is particularly used to receive industrial protocol messages transferred in the system through the second network port and obtain the information about the remotely accessible resources in the system from the received industrial protocol messages according to different industrial protocols.

In this way, the information about remotely accessible resources in the system is automatically obtained through the access control device and the access of the remotely accessing computer is controlled.

Further, the back-end firewall can send detection messages of different industrial protocols to the system through the second network port and receive the messages which the system sends in response to the detection messages sent by the back-end firewall. In this way, the back-end firewall can proactively obtain industrial protocol messages by sending detection messages, and then obtain the information about the remotely accessible resources in the system from the industrial protocol messages.

Alternatively, the front-end firewall allows the computer only having a specific IP address and/or a specific port to access the system, and/or provides a secure connection between the access control device and the computer through the first network port. In this way, finer access control is realized.

Alternatively, the bastion host is used to perform user authentication for the computer and/or provide a remote desktop for the remote access from the computer to the system. Remote engineers can log into the remote desktop to realize the access to the system, for example, the access to the equipment and applications in the system.

Alternatively, the access control device can further comprise an auditing module, which is respectively connected with the front-end firewall, the back-end firewall and the bastion host and is used to audit at least one item of the following information:

security log of the front-end firewall,
security log of the back-end firewall,
security log of the bastion host,
NetFlow and/or network traffic between the front-end firewall and the bastion host, and
NetFlow and/or network traffic between the bastion host and the back-end firewall, wherein the auditing module can obtain the record of remote accesses to the system from the collected auditing data to realize secure monitoring in the accesses such as remote diagnosis and maintenance.

In a second embodiment, an access control method is provided and is used to provide a secure access control mechanism for a system when the system is remotely accessed. The method can comprise the following steps: the access control device connected between the system and a computer to remotely access the system determines the remotely accessible resources in the system, the access control device determines the resources which the computer can remotely access among the remotely accessible resources in the system according to the preconfigured remote access control policies, and the access control device provides information about the resources which the computer can remotely access for the computer so that the computer can remotely access the resources.

In this method, the access control device integrating the functions of the firewalls and the bastion host has the advantages of plug-and-play and ease-of-use, effectively lowers the cost and effectively reduces the complexity of remote diagnosis and maintenance while the remote access security is guaranteed. The remote access device can effectively prevent critical equipment, for example, industrial controller and insecure and vulnerable equipment, in the system from being exposed to the Internet. The front-end firewall in the access control device can prevent unauthorized accesses, and the back-end firewall can determine the remotely accessible resources in the system and allow a remote computer to access the designated resources in the system according to the preconfigured policies.

Alternatively, the access control device further provides the manager of the system with the information about the determined remotely accessible resources in the system, receives a configuration command from the manager of the system, configures remote access control policies for the remotely accessible resources in the system, and configures remote access control policies for the remotely accessible resources in the system according to the received configuration command.

Furthermore, the manager of the system can configure remote access control policies in advance. In this way, the plug-and-play feature of the access control device is further guaranteed. After the access control device is deployed, effective security protection can be realized for the system according to the preconfigured remote access control policies.

Or, the access control device configures remote access control policies for the remotely accessible resources in the system according to the preset configuration rules. In this way, the configuration difficulty of the access control device is further lowered.

Alternatively, the system is an OT system, and when determining the remotely accessible resources in the system, the access control device can receive industrial protocol messages transferred in the system and obtain the information about the remotely accessible resources in the system from the received industrial protocol messages according to different industrial protocols. In this way, the information about remotely accessible resources in the system is automatically obtained through the access control device and the access of the remotely accessing computer is controlled.

Further, before the access control device receives industrial protocol messages transferred in the system, the access control device sends detection messages of different industrial protocols to the system, and the industrial protocol messages transferred in the system and received by the access control device include the messages which the access control device sends in response to the detection messages sent by the back-end firewall 503. In this way, the back-end firewall can proactively obtain industrial protocol messages by sending detection messages, and then obtain the information about the remotely accessible resources in the system from the industrial protocol messages.

Alternatively, the method further comprises the access control device allowing the computer only having a specific IP address and/or a specific port to access the system, and/or the access control device providing a secure connection between the access control device and the computer. In this way, finer access control is realized.

Alternatively, the method can further comprise performing user authentication for the computer and/or providing a remote desktop for the remote access from the computer to the system. Remote engineers can log into the remote desktop to realize the access to the system, for example, the access to the equipment and applications in the system.

Alternatively, the access control device comprises a front-end firewall connected with the computer, a bastion host connected with the front-end firewall and a back-end firewall connected with the bastion host and the system, and the method further comprises the access control device auditing at least one item of the following information:

security log of the front-end firewall, security log of the back-end firewall,
security log of the bastion host,
NetFlow or network traffic between the front-end firewall and the bastion host, and
NetFlow or network traffic between the bastion host and the back-end firewall.

In this way, the record of remote accesses to the system can be obtained from the collected auditing data to realize secure monitoring in the accesses such as remote diagnosis and maintenance.

In the third embodiment, an access control device is provided and comprises at least one storage used to store computer readable codes and at least one processor used to invoke the computer readable codes to execute the method in the second embodiment.

In the fourth embodiment, a computer program product is provided, the computer program product is tangibly stored in a computer readable medium and comprises computer executable instructions, and at least one processor executes the method in the second embodiment when the computer executable instructions are executed.

In the fifth embodiment, a computer readable medium is provided, computer readable instructions are stored in the computer readable medium, and a processor executes the method in the second embodiment when the computer readable instructions are executed by the processor. As mentioned above, an OT system faces the risk of network attacks, and especially when the OT system is remotely accessed, the OT system may face various network security threats because no effective security protection measures are taken.

The embodiments of the present invention provide an access control method and an access control device, and the access control method and access control device are applied during remote access to a system, for example an OT system, to provide an effective security protection method for the system. With the practical requirements of the system operator fully considered, the method and the device have the advantages of ease-of-use and plug-and-play and effectively lower the security risks of the system.

A system for which OT is adopted is called an "OT system" below. An ICS can be considered as an example of an OT system.

The following will describe in detail the method and device provided in the embodiments of the present invention in combination with the drawings.

Currently, remote access is usually adopted for fault diagnoses and maintenance of an OT system. FIG. 1 shows a way of remotely accessing the OT system. In the figure, the computer 20 which will remotely access the OT system is connected to the OT system 10 over Internet 30. The OT system 10 includes but is not limited to the following devices:

1) At Least One Industrial Controller 1011

The industrial controller 1011 can be a programmable logical controller (PLC), a distributed control system (DCS) controller or a remote terminal unit (RTU). At least one industrial controller 1011 can be connected to a distributed I/O device 1012 or itself integrates a distributed I/O interface to control the input and output of data. The industrial controller 1011 can be connected to field equipment 40 to control the operations on the field equipment 40. Most industrial controller 1011 are dedicated embedded equipment and are realized based on an embedded operating system (for example, VxWorks, embedded Linux, EOS, ucLinux, and various proprietary operating systems). Industrial controllers 1011 is used to realize reliable and real-time industrial control and usually lacks security features such as access control (for example, identification, authentication and authorization). A control unit 100 can comprise at least one industrial controller 1011.

2) At Least One Distributed Input/Output (I/O) Device 1012

3) At Least One Industrial Host

Industrial hosts can include upper monitors, such as workstation or server realized based on a personal computer (PC). For example, industrial hosts can include an engineer station 1013a, an operator station 1013b, a server 1013c and a human machine interface (HMI) 1013d. In the OT system 10, industrial hosts can monitor and control the industrial controller 1011 over an industrial Ethernet 1014. For example, industrial hosts control data reading of the industrial controller 1011 from field equipment 40 (for example, reading of the status parameter of field equipment from a sensor), save data in a history database, and send a control command to the industrial controller 1011. Among these upper monitors, the engineer station 1013a can also be used to configure the industrial controller 1011. Relative to the control unit 100, at least one industrial host is at the management layer.

4) Industrial Control Network 1014

An industrial control network 1014 can comprise at least one network device, which is used to connect industrial controllers 1011 and industrial hosts. Currently, more and more industrial control networks 1014 are realized based on an industrial Ethernet. Communication in an industrial control network 1014 can be based on the transmission control protocol (TCP), user datagram protocol (UDP), Internet protocol (IP) and Ethernet, and the network devices can include but are not limited to routers and switches. An industrial control network 1014 can be connected with other networks, for example, networks of factories or office networks.

On the one hand, the remotely accessing computer 20 can usually be directly connected with the OT system 10 over the Internet. On the other hand, the engineer can log into the remotely accessing computer 20 over the Internet, an asymmetric digital subscriber line (ADSL) or a wide area network (WAN) for 4th generation (4G) mobile communication, and then access the OT system 10 through the remotely accessing computer 20. Since no effective security protection measures are taken for the remotely accessing computer 20 (for example, a remote access of the computer is allowed only over a virtual private network (VPN)), the remote access may bring about security risks to the OT system 10.

Figure 2:
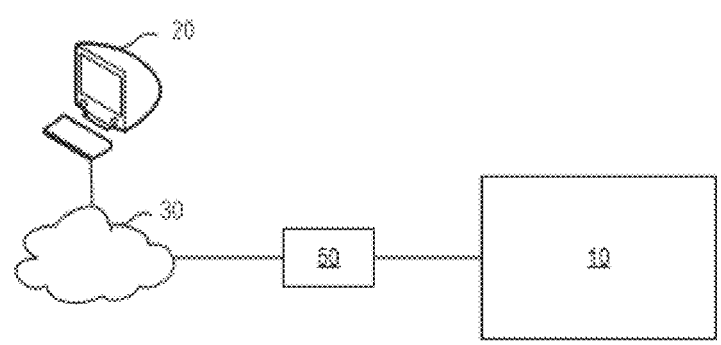
FIG. 2 shows the connections between an access control device provided in the embodiments of the present invention, an accessed system and a computer to remotely access the system.
Figure 3:
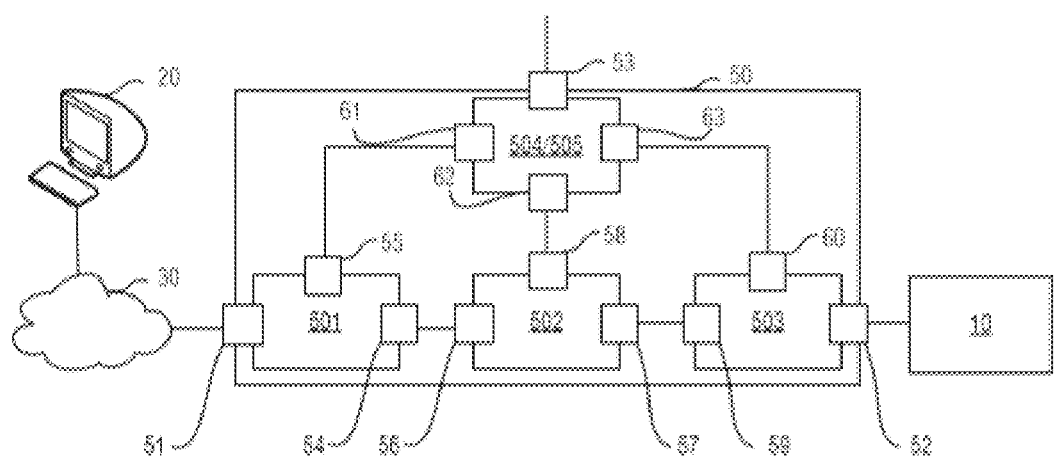
FIG. 3 shows one structure of the access control device provided in the embodiments of the present invention.

In the embodiments of the present invention, an easy-to-use and plug-and-play security solution is provided by integrating various security means into a device, and the security solution can effectively protect a system against the security risks which the system may face when remotely accessed. The security means integrated into the device can include but are not limited to adopting a VPN connection, deploying a bastion host, providing an access control, and monitoring logs and NetFlow. As shown in FIGS. 2 and 3, the device 50 can be deployed on one side of the system 10 and between the system 10 and the remotely accessing computer 20. As shown in FIG. 3, the device 50 can comprise:

a front-end firewall 501 providing a first network port 51, wherein the first network port 51 is used to directly or indirectly (for example, over a WAN) connect with a computer 20 to remotely access the system 10, a bastion host 502 which is connected with the front-end firewall 501 and can realize the following functions:

1) perform user authentication for the computer 20;
2) provide a remote desktop, including but not limited to remote desktop protocol (RDP) remote desktop and TeamViewer remote desktop, for the computer 20 to remotely access the system 10; allow the remote engineer to log into the remote desktop to realize the access to the system 10, for example, the access to the equipment and applications in the system 10;
3) integrate the host-based intrusion detection systems (IDSs) to monitor the operations of a remote engineer;

a back-end firewall 503 connected to the bastion host 502 and providing a second network port 52, wherein the second network port 52 is used to connect the system 10 and the back-end firewall 503 is used to detect the remotely accessible resources (for example, equipment or an application) in the system 10 through the second network port 52 and obtain the information (for example, IP address, port No., equipment type and application type) about the detected resources.

Alternatively, the back-end firewall 503 can particularly receive industrial protocol messages transferred in the system 10 through the second network port 52 and obtain the information about the remotely accessible resources from the received industrial protocol messages according to different industrial protocols. The back-end firewall 503 can not only obtain industrial protocol messages transferred in the OT system 10 through passive monitoring to further obtain the information about the remotely accessible resources from the received industrial protocol messages, but also proactively detect the OT system 10 (for example, send specific messages of an industrial protocol or industrial protocols). According to the provisions of the corresponding industrial protocols, the equipment receiving the specific messages in the system 10 will send industrial protocol messages in response to the specific messages and the back-end firewall 503 can obtain the information about the remotely accessible resources from the received response messages. The following examples describe passive and proactive acquisitions of the information about the remotely accessible resources.

For example, for the OT system 10 for which the PROFINET protocol is adopted, the back-end firewall 503 can (passively) monitor the link layer discovery protocol (LLDP) messages periodically broadcast by the equipment in the system to obtain information such as medium access control (MAC) address, IP address, host name, hardware version and firmware/software version about the equipment.

Again for example, the OT system 10 for which the PROFINET protocol is adopted, the back-end firewall 503 can (proactively) broadcast PROFINET discovery and basic configuration protocol (PN-DCP) messages in the OT system 10 and obtain the information such as MAC address, IP address, host name, hardware version and firmware/software version from the messages sent in response by the equipment.

Again for example, for the OT system 10 supporting other industrial control protocols (for example, S7Comm/S7Comm+), the back-end firewall can obtain the network configuration information about the equipment by proactively sending polling messages in the OT system 10.

In addition, the back-end firewall 503 can also detect the information about applications during detections. For example, when performing a detection through SNMP, the back-end firewall can obtain the information such as network port on which an application resides.

When a remote computer 20 accesses the system 10, the back-end firewall 503 can provide information about the resources which the computer 20 can remotely access. Usually, different users on different computers 20 have different access rights to a system 10, for example, an OT system. For example, some computers 20 can remotely access the industrial controllers and the industrial hosts in the system 10, while the other computers 20 can remotely access only the industrial hosts. Again for example, one computer 20 can access some industrial hosts in the system 10, while another computer 20 can access the other industrial hosts in the system 10. The back-end firewall 503 can determine the resources which the computer 20 can remotely access in the system 10, and the information about these resources according to the preconfigured remote access control policies. Through the first network port 51 of the front-end firewall 501, the bastion host 502 can provide the computer 20 with the information about the resources which the back-end firewall 503 determines to be remotely accessed by the computer 20 so that the computer 20 can remotely access the resources.

Alternatively, the access control device 50 can further comprise a management module 504. The management module 504 can be connected with the back-end firewall 503 and can be used to configure the remote access control policies on the back-end firewall 503. When the management module 504 is used to configure the remote access control policies on the back-end firewall 503, the following three modes can be adopted:

Mode 1. The manager of the system 10 configures the remote access control policies through the management module 504.

For mode 1, the management module 504 provides a third network port 53, the third network port 53 is used to interact with the manager of the system 10, and the manager of the system 10 configures the remote access control policies on the back-end firewall 503 through the management module 504. Through the third network port 53, the management module 504 can provide the manager of the system 10 with the information about the remotely accessible resources detected by the back-end firewall 503 in the system 10, and the manager of the system 10 configures the remote access control policies according to the received information. For example, when configuring the remote access control policies on the back-end firewall 503 through the management module 504, the manager only needs to select the corresponding resources to complete the configurations.

The methods of configuring the remote access control policies include but are not limited to:

Method 1. Configure a corresponding remote access control policy for each remotely accessible resource.

Method 2. Classify the remotely accessible resources and configure a corresponding remote access control policy for each type of remotely accessible resource.

Method 3. Configure the same remote access control policy for all remotely accessible resources.

Table 1 gives an example to describe method 1.

| Resource | IP address and port No. of resource | IP address and port No. of the computer 20 allowed to remotely access the resource |
|---|---|---|
| Resource 1 | 192.168.134.2: 80 | 128.11.3.31:10090, 128.11.3.32:10090 |
| Resource 2 | 192.168.134.3: 80 | 128.11.3.31:10090 |
| Resource 3 | 192.168.134.4: 80 | 128.11.3.32:20090 |
| . . . | | |

The manager of the system 10 can configure the above-mentioned remote access control policies by sending a configuration command for remote access control policies to the management module 504 through the third network port 53.

Mode 2. The management module 504 itself configures the remote access control policies.

For mode 2, the management module 504 can configure remote access control policies for the remotely accessible resources in the system 10 according to the preset configuration rules. Those preset configuration rules can include but are not limited to:

the remotely accessing computer 20 is allowed to access only the resources provided by the industrial hosts in the system 10;

the remotely accessing computer 20 is allowed to access only the resources whose IP addresses are in the range of A to B in the system 10, and the remotely accessing computer 20 is allowed to access the resources other than industrial controllers 1011 in the system 10.

Mode 3. Hybrid Configuration

For mode 3, a plurality of optional typical scenarios can be set in advance, and the management module 504 configures the remote access control policies according to the preset configuration rules (for details, see mode 2). What the manager of the system 10 needs to do is to select one from the plurality of typical scenarios. Thus, the configuration complexity is greatly lowered. The manager does not need to have an in-depth understanding of the policy configuration rules of each module in the access control device 50, but only needs to select a policy from a plurality of policies and configure the network according to the actual network situation.

Alternatively, the management module 504 can also realize the configuration of the remote access control policies on the front-end firewall 501 and the bastion host 502. Similarly, the remote access control policies can be configured by the manager or by the management module 504 itself, or the management module 504 provides a plurality of typical scenarios and the manager selects one from the plurality of typical scenarios.

Alternatively, the manager can configure each module in the access control device 50 through the graphical user interface (GUI) provided by the management module 504. The above-mentioned configuration items can include but are not limited to:

1) security policies, namely, remote access control policies on the front-end firewall 501 and the back-end firewall 503, and
2) remote access control policies, for example, remote desktop policy and detection policy of IDS, on the bastion host 502.

In addition, the management module 504 can further be used to configure:

1) parameters of the security logs of the front-end firewall 501, the back-end firewall 503 and the bastion host 502, and
2) forwarding parameters of the NetFlow and/or network traffic on the front-end firewall 501 and the back-end firewall 503.
3) Now how the auditing module 505 collects and stores auditing data is described.

The targets of the remote access control policies on the front-end firewall 501, the bastion host 502 and the back-end firewall 503 are different, wherein the front-end firewall 501 mainly provides (source) access authentication and allows only the designated manufacturer's computer to remotely access the system 10 through VPN, certificate and IP address, the bastion host 502 mainly restricts the software and tools which the remote computer 20 can use, and the back-end firewall 503 restricts the resources (IP address and port No.) which the remote computer 20 can access through the bastion host 502 in the OT system 10.

In addition, the access control device 50 can further comprise an auditing module 505, which is respectively connected with the front-end firewall 501, the back-end firewall 503 and the bastion host 502, and is used to audit at least one item of the following information:

security log of the front-end firewall 501,
security log of the back-end firewall 503,
security log of the bastion host 502,
NetFlow or network traffic between the front-end firewall 501 and the bastion host 502, and
NetFlow or network traffic between the bastion host 502 and the back-end firewall 503, wherein the auditing module 505 can obtain the record of remote accesses to the system 10 from the collected auditing data to realize secure monitoring in the accesses such as remote diagnosis and maintenance. In terms of realization, the auditing module 505 and the management module 504 can be one module or different modules.

The modules of the access control device 50, the functions of each module, and the mutual cooperation between the modules are described above. The modules in the access control device 50 are not independent hosts, but are integrated into a system to provide a uniform and simple configuration mode. They can lower the complexity and cost of the device and are used to simply realize a demilitarized zone (DMZ) for remote diagnoses and maintenance. The following describes the network ports in the access control device 50. Each module in the access control device 50 can have nine network ports, but users are provided with only three network ports, namely, 1) Internet port, namely, the above-mentioned first network port 51,
2) Intranet port, namely, the above-mentioned second network port 52, and
3) network port for management and auditing, namely, the above-mentioned third network port 53.

Alternatively, the front-end firewall 501 can have three network ports:

1) Internet port, namely, the above-mentioned first network port 51, which is an external network interface of the front-end firewall 501 and can provide different ways of Internet accesses, including but not limited to ADSL, very high speed digital subscriber line (VDSL), cable modem (CM) and local area network (LAN). The remote access control polices on the front-end firewall 501 can be configured on the first network port 51, for example, to allow the computer 20 only having the specific IP address and/or specific port to access the system 10. Alternatively, the front-end firewall 501 can provide a secure connection, for example, a VPN connection, between the access control device 50 and the computer 20 through the first network port 51;
2) internal network port 54, which is an internal network interface of the front-end firewall 501 and is connected with the input port 56 of the bastion host 502;
3) management port 55, which is an internal network interface of the front-end firewall 501 and can be connected with the management module 504. The user can configure the security policies for the front-end firewall 501 through the management module 504. The front-end firewall 501 can further send a security log, NetFlow (including source/destination IP address, source/destination port, protocol type, message length and summary information of the application layer), network traffic (complete network message, including application-layer payload), and switch port analyzer (SPAN) traffic to the auditing module 505 through the management port 55.

The bastion host 502 can have the following three network ports:
1) input port 56, which is connected with the internal network port 54 of the front-end firewall 501. The remote engineer can log into the bastion host 502 through the input port 56;
2) output port 57, which is connected with the internal network port 59 of the back-end firewall 503. The remote engineer can further access the system 10, for example, the equipment and applications in the system 10, through the output port 57 on the bastion host 502;
3) management port 58, which can be connected with the management module 504. The user can configure the bastion host 502 and the IDS in the bastion host through the management module 504. The bastion host 502 can further send security logs to the auditing module 505 through the management port 55.

The back-end firewall 503 can have the following three network ports:
1) internal network port 59, which is an internal network interface of the back-end firewall 503 and is connected with the output port 57 of the bastion host 502;
2) Intranet port, namely, the above-mentioned second network port 52, which is connected with the system 10. The security policies for the corresponding firewall can be configured on the second network port 52 to restrict the access from the bastion host 502 to specific equipment and/or applications in the system 10;
3) management port 60, which is an internal network interface of the back-end firewall 503 and can be connected with the management module 504. The user can configure the security policies for the back-end firewall 503 through the management module 504. The back-end firewall 503 can send security logs, NetFlow, network traffic and SPAN traffic to the auditing module 505 through the management port 60.

The management module 504 and the auditing module 505 can be realized as one network entity or can be realized as independent network entities. When they are realized as one network entity, the network entity can have the following four network ports:
network port 61 connected with the management port 55 of the front-end firewall 501,
network port 62 connected with the management port 58 of the bastion host 502,
network port 63 connected with the management port 59 of the back-end firewall 503, and
above-mentioned third network port 53. Through the third network port 53, the user can configure the whole access control device 50 and extract auditing data, including the above-mentioned security logs, NetFlow, network traffic and SPAN traffic obtained from the front-end firewall 501, the bastion host 502 and the back-end firewall 503.

Figure 4:
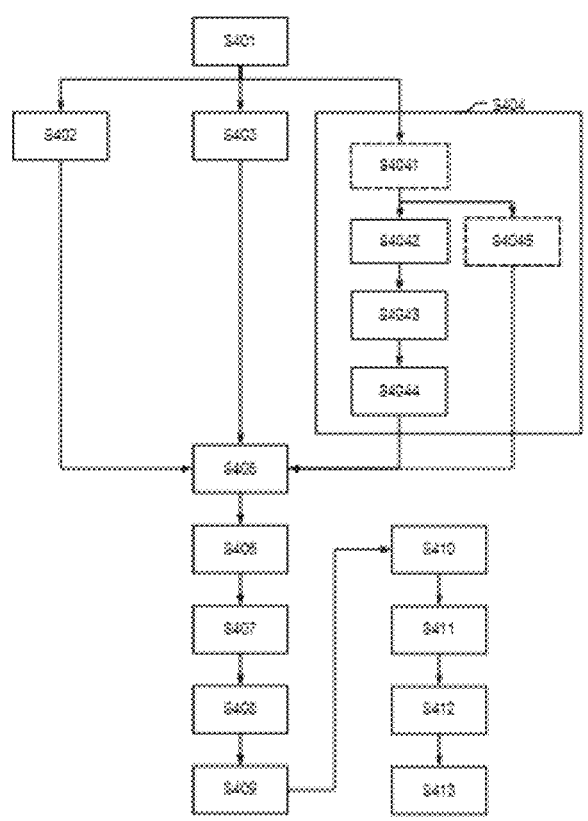
FIG. 4 is a flowchart of the access control method provided in the embodiments of the present invention.

The internal composition, structure, module function classification and network ports of the access control device 50 are described above. Based on the same conception of the invention, the embodiments of the present invention further provide an access control method. The method is realized by the access control device 50 and is used to provide a secure access control mechanism for a system 10 when the system 10 is remotely accessed. As shown in FIG. 4, the method can comprise the following steps:

S401: Network connection and equipment power-on.

The access control device 50 can be connected with the computer 20 and the system 10 respectively, as shown in FIG. 2. The network port 51 is connected with the computer 20, and the network port 52 is connected with the system 10. The network port 53 is provided for the manager of the system 10 to configure the modules, for example, remote access control policies, in the access control device 50.

S402: The management module 504 configures the remote access control policies for the front-end firewall 501, the parameters of security logs, and the forwarding parameters of NetFlow and/or network traffic.

S403: The management module 504 configures remote access control policies for the bastion host 502 and the parameters of security logs.

S404: The management module 504 configures the remote access control policies for the back-end firewall 503, the parameters of security logs, and the forwarding parameters of NetFlow and/or network traffic.

Wherein, steps S402, S403 and S404 can concurrently be executed, but not in a particular order.

For mode 1 in which the management module 504 configures the back-end firewall 503, step S404 can comprise the following substeps:

Substep S4041: The back-end firewall 503 automatically determines the remotely accessible resources in the system 10 and provides them for the management module 504.

Substep S4042: The management module 504 provides the information about the remotely accessible resources determined by the back-end firewall 503 in the system 10 for the manager of the system 10.

Substep S4043: The management module 504 receives a configuration command from the manager of the system 10.

Substep S4044: The management module 504 configures remote access control policies for various resources according to the configuration command.

For mode 2 in which the management module 504 configures the back-end firewall 503, step S404 can comprise the following substeps:

Substep S4045: The management module 504 configures remote access control policies for various resources according to the preset configuration rules.

If the modules are already configured before the power-on, it is unnecessary to perform steps S402 to S404 after the power-on (step S401). Of course, the configurations of the modules can be modified after the access control device 50 is powered on.

S405: The front-end firewall 501 provides a secure VPN and receives a remote access request from the computer 20.

S406: The front-end firewall 501 controls the remote access of the computer 20 to the system 10 according to the configured remote access control policies (for example, controls the access of the computer 20 according to the IP address and/or port No. of the computer 20).

S407: The bastion host 502 controls the remote access of the computer 20 to the system 10 according to the configured remote access control policies (for example, performs user authentication for the computer 20 and provides a remote desktop for the access of the computer 20 to the system 10).

S408: The back-end firewall 503 determines the resources which the computer 20 can remotely access according to the configured remote access control policies.

S409: The bastion host 502 displays the resources which the computer 20 can remotely access on the remote desktop and realizes the communication with the computer 20 through the front-end firewall 501.

S410: The bastion host 502 receives a request for a remote access to the resources in the system 10 on the remote desktop from the computer 20 and sends the information about the remote access to the back-end firewall 503.

S411: The back-end firewall 503 controls the remote access of the computer 20 according to the remote access control policies for the resources which the computer 20 remotely accesses, and sends the result of the remote access of the computer 20 to the bastion host 502.

S412: The bastion host 502 displays the result of the remote access to the computer 20 on the remote desktop and realizes the communication with the computer 20 through the front-end firewall 501.

After the access control device 50 is powered on, the access control device 50 can further perform the following steps:

S413: The auditing module 505 audits the front-end firewall 501, the back-end firewall 503 and the bastion host 502.

For the optional realization modes of the steps of the method, refer to the description in the introduction of the access control device 50. They will not be described again here.

Figure 5:
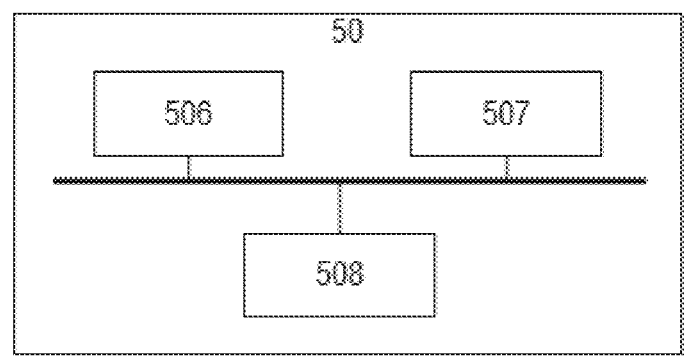
FIG. 5 shows another structure of the access control device provided in the embodiments of the present invention.

As shown in FIG. 5, in terms of hardware realization, the access control device 50 provided in the embodiments of the present invention can comprise:

at least one storage 506, used to store computer readable codes, and at least one processor 507, used to invoke computer readable codes to execute the access control method shown in FIG. 4.

At least one storage 506 and at least one processor 507 can be connected to a bus, and in addition, the access control device 50 can further provide at least one network interface 508, which is used to provide the above-mentioned network ports. The network interface 508, the storage 506 and the processor 507 can communicate with each other through a bus.

The modules of the access control device 50: front-end firewall 501, back-end firewall 503, bastion host 502 and management module 504 can be considered as program modules in the computer readable codes stored in at least one storage 506 shown in FIG. 5 and are invoked by at least one processor 507 to execute the access control method provided in the embodiments of the present invention.

In addition, the above-mentioned modules can also be considered as functional modules realized by the combination of hardware and software and are used to realize the functions involved when the access control device 50 executes the access control method. The above-mentioned modules can also be considered as functional modules realized by hardware and are used to realize the functions involved when the access control device 50 executes the access control method. For example, the control logics of various processes involved in the access control method are burned into field programmable gate array (FPGA) chips or complex programmable logic devices (CPLDs) in advance, and then these chips or devices execute the functions of the above-mentioned modules. The particular realization mode depends on the engineering practice.

In addition, the embodiments of the present invention further provide a computer readable medium. Computer readable instructions are stored in the computer readable medium and a processor executes the access control method shown in FIG. 4 when the computer readable instructions are executed by the processor. Embodiments of computer readable media include floppy disks, hard disks, magneto-optical disks, compact disks (for example, CD-ROM, CD-R, CD-RW, DVD-ROM, DVD-RAM, DVD-RW, DVD+RW, magnetic tape, non-volatile memory card, and read-only memory (ROM). Alternatively, computer readable instructions can be downloaded from the server computer or cloud over a communication network.

The following gives an example of remote maintenance in a factory to further describe the embodiments of the present invention.

In a factory, an engineer of the factory can connect the first network port 51 of the access control device 50 to the Internet 30 through ADSL or other Internet access modes, and connect the second network port 52 of the access control device 50 to the factory. When it is necessary to perform a remote diagnosis or maintenance, the engineer can utilize the GUI provided by the management module 504 to establish a connection with the Internet 30. An engineer of the vendor can use the remote desktop protected by RDP, TeamViewer or other VPNs to log into the bastion host 502 of the access control device 50. A corresponding remote access control policy is configured on the front-end firewall 501 to allow only the vendor's computers 20 having the designated IP addresses and port Nos. to access the bastion host 502. In addition, the bastion host 502 can use the virtualization technology to create a separate virtual machine for each remotely accessing computer 20 of the vendor to guarantee that the remotely accessing computers 20 are isolated from the host operating system of the bastion host 502. After logging into the bastion host 502, the engineer of the vendor can use the remote desktop on the computer 20 of the vendor or other ways to access the accessible resources such as equipment and applications in the factory and perform remote diagnoses and maintenance. Since remote access control policies are configured on the back-end firewall 503, the engineer of the vendor can only access the resources which are authorized to be accessed and are identified by IP addresses and port Nos. from the computers 20 of the vendor. Thus, finer access control is realized. Alternatively, IDS-based remote access control policies can be configured on the bastion host 502 to monitor the behaviors and traffic of the computers 20. During the whole remote access, the security logs, NetFlow and/or network traffic of the front-end firewall 501, the bastion host 502 and the back-end firewall 503 can be sent to the auditing module 505 based on the preconfigured remote access control policies. The auditing module 505 can store the received logs and traffic, and their storage cycles depend on the requirements of the vendor. When a security attack happens, the stored data can be used for security analysis.

In this way, critical equipment, for example, industrial controllers 1011 and insecure and vulnerable equipment, in the system 10 can effectively be prevented from being exposed to the Internet. The front-end firewall 501 in the access control device 50 can block unauthorized accesses, and the back-end firewall 503 can restrict remote computers 20 from accessing the designated resources in the system 10. The bastion host 502 can lower the risk of the distribution of malicious software from the computers 20. A secure connection can provide encrypted and authorized communication. Potential security risks can be monitored effectively. The auditing module 505 can provide data for security analysis.

On the one hand, the functions of the firewalls, the bastion host and secure auditing are integrated into an access control device 50. The access control device has the advantages of plug-and-play and ease-of-use, effectively lowers the cost and effectively reduces the complexity of remote diagnoses and maintenance while the remote access security is guaranteed. On the other hand, presetting optional typical scenarios makes it simple to configure remote access control policies. The configurations of the modules can easily be realized without any professional knowledge in the configurations of the firewalls and the bastion host.

In short, the embodiments of the present invention provide an access control device and an access control method. They are used to provide a secure access control mechanism for a system when a computer remotely accesses the system. For the security requirements for remote diagnoses and maintenance of the system, an integrated access control method is provided. The integrated access control method is characterized by ease-of-use and plug-and-play and lowers the security risks of the system.

It should be noted that not all steps or modules in the above-mentioned flowcharts and system structure diagrams are required, and some steps or modules can be ignored, depending on the actual requirements. The execution sequence of the steps is not fixed and can be adjusted as required. The system structures described in the above-mentioned embodiments can be physical structures or logical structures. That is to say, some modules may be realized by a physical entity, or some modules may be realized by a plurality of physical entities or may jointly be realized by some components in a plurality of self-contained devices.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An access control device to provide a secure access control mechanism for a system upon the system being accessed remotely, the access control device comprising:
   a front-end firewall configured to provide a first network port, the first network port configured to connect a computer to remotely access the system;
   a bastion host of the access control device, the bastion host connected to the front-end firewall to provide information about resources remotely accessible by the computer and to permit the resources to be remotely accessible by the computer; and
   a back-end firewall connected to the bastion host and configured to provide a second network port, the second network port configured to connect to the system, wherein
      the back-end firewall is further configured to
         determine, through the second network port, remotely accessible resources in the system and
         determine resources remotely accessible by the computer, from among the remotely accessible resources in the system, according to remote access control policies,
      the bastion host is configured to provide the computer with information provided by the back-end firewall, about the resources remotely accessible by the computer through the first network port of the front-end firewall, to permit the resources to be remotely accessible by the computer, and
      the back-end firewall is further configured to
         receive industrial protocol messages, the industrial protocol messages transferred in the system, and
         obtain information about the remotely accessible resources in the system from the industrial protocol messages according to different industrial protocols, the information about the remotely accessible resources in the system including a hardware version, wherein the back-end firewall is further configured to at least monitor the industrial protocol messages periodically broadcast by the remotely accessible resources to obtain the hardware version of the respective remotely accessible resources.

2. The access control device of claim 1, wherein
the access control device further includes a management module connected with the back-end firewall,
the management module provides a third network port, the third network port configured to interact with a manager of the system, and
the management module is configured to either
   provide the manager of the system with the information about the remotely accessible resources in the system through the third network port, receive a configuration command from the manager of the system through the third network port, wherein the configuration command is usable to configure remote access control policies for the remotely accessible resources in the system, and configure remote access control policies for the remotely accessible resources in the system according to the configuration command, or
   configure remote access control policies for the remotely accessible resources in the system according to preset configuration rules.

3. The access control device of claim 2, wherein the system is an operational technology (OT) system, and the back-end firewall is configured to
   receive the industrial protocol messages through the second network port, and
   obtain the information about the remotely accessible resources in the system from the industrial protocol messages.

4. The access control device of claim 3, wherein the back-end firewall is configured to
send detection messages of the different industrial protocols to the system through the second network port, and
receive industrial protocol messages sent by the system in response to the detection messages sent by the back-end firewall.

5. The access control device of claim 2, wherein the front-end firewall is configured to at least one of:
allow only the computer, which includes at least one of a specific IP address or a specific port, to access the system, or
provide a secure connection between the access control device and the computer through the first network port.

6. The access control device of claim 2, wherein the bastion host is configured to at least one of:
perform user authentication for the computer, or
provide a remote desktop for remote access from the computer to the system.

7. The access control device of claim 1, wherein the system is an operational technology (OT) system, and the back-end firewall is configured to
receive the industrial protocol messages through the second network port, and
obtain the information about the remotely accessible resources in the system from the industrial protocol messages.

8. The access control device of claim 7, wherein the back-end firewall is further configured to
send detection messages of different industrial protocols to the system through the second network port, and
receive industrial protocol messages sent by the system in response to the detection messages sent by the back-end firewall.

9. The access control device of claim 1, wherein the front-end firewall is configured to at least one of:
allow only the computer, which includes at least one of a specific IP address or a specific port, to access the system, or
provide a secure connection between the access control device and the computer through the first network port.

10. The access control device of claim 1, wherein the bastion host is configured to at least one of:
perform user authentication for the computer, or
provide a remote desktop for remote access from the computer to the system.

11. The access control device of claim 1, further comprising:
an auditing module connected with the front-end firewall, the back-end firewall and the bastion host, the auditing module configured to audit at least one of:
a security log of the front-end firewall,
a security log of the back-end firewall,
a security log of the bastion host,
at least one of NetFlow or network traffic between the front-end firewall and the bastion host, or
at least one of NetFlow or network traffic between the bastion host and the back-end firewall.

12. An access control method for providing a secure access control mechanism for a system when the system is accessed remotely, the access control method comprising:
determining, by a back-end firewall of an access control device, remotely accessible resources in the system, the access control device connected between the system and a computer configured to remotely access the system;
determining, by the back-end firewall of the access control device, resources remotely accessible by the computer, from among the remotely accessible resources in the system, according to remote access control policies, wherein the determining the resources remotely accessible by the computer includes
receiving, by the back-end firewall, industrial protocol messages, the industrial protocol messages transferred in the system, and
obtaining, by the back-end firewall, information about the remotely accessible resources in the system from the industrial protocol messages according to different industrial protocols, the information about the remotely accessible resources in the system including a hardware version, wherein the back-end firewall monitors the industrial protocol messages periodically broadcast by the remotely accessible resources to obtain the hardware version of the respective remotely accessible resources; and
providing, for the computer by a bastion host of the access control device through a first network port of a front-end firewall, information about the resources remotely accessible by the computer, to permit the resources to be remotely accessible by the computer, wherein
the bastion host is connected with the front-end firewall and the back-end firewall is connected with the bastion host and the system through a second network port.

13. The method of claim 12, further comprising:
providing, via the access control device, a manager of the system with the information about the remotely accessible resources in the system;
receiving a configuration command from the manager of the system; and
configuring remote access control policies for the remotely accessible resources in the system, the configuring including either
configuring the remote access control policies for the remotely accessible resources in the system according to the configuration command, or
configuring the remote access control policies for the remotely accessible resources in the system, according to configuration rules.

14. The method of claim 13, wherein the system is an OT system.

15. The method of claim 14, further comprising:
sending, before the access control device receives the industrial protocol messages transferred in the system, detection messages of the different industrial protocols to the system, and wherein
the industrial protocol messages transferred in the system and received by the access control device include industrial protocol messages sent by the system in response to the detection messages.

16. The method of claim 12, wherein the system is an OT system.

17. The method of claim 16, further comprising:
sending, via the back-end firewall, detection messages of the different industrial protocols to the system before the access control device receives the industrial protocol messages transferred in the system, wherein the industrial protocol messages transferred in the system and received by
the access control device include messages sent by the access control device in response to the detection messages sent by the back-end firewall.

18. The method of claim 12, further comprising at least one of:

allowing, via the access control device, the computer, which includes only at least one of a specific IP address or a specific port, to access the system, or providing, via the access control device, a secure connection between the access control device and the computer.

19. The method of claim 12, further comprising at least one of:

performing user authentication for the computer, or providing a remote desktop for remote access from the computer to the system.

20. The method of claim 12, further comprising:

auditing, via the access control device, at least one of:

a security log of the front-end firewall, a security log of the back-end firewall, a security log of the bastion host, NetFlow or network traffic between the front-end firewall and the bastion host, or NetFlow or network traffic between the bastion host and the back-end firewall.

21. An access control device connected between a system and a computer configured to remotely access the system, the access control device comprising:

at least one storage storing computer readable code, and at least one processor configured to execute the computer readable code to perform determining, by a back-end firewall of the access control device, remotely accessible resources in the system, determining, by the back-end firewall, resources remotely accessible by the computer, from among the remotely accessible resources in the system, according to remote access control policies, wherein the determining the resources remotely accessible by the computer includes receiving, by the back-end firewall, industrial protocol messages, the industrial protocol messages transferred in the system, and obtaining, by the back-end firewall, information about the remotely accessible resources in the system from the industrial protocol messages according to different industrial protocols, the information about the remotely accessible resources in the system including a hardware version, wherein the back-end firewall monitors the industrial protocol messages periodically broadcast by the remotely accessible resources to obtain the hardware version of the respective remotely accessible resources, and providing, for the computer by a bastion host of the access control device through a first network port of a front-end firewall, information about the resources remotely accessible by the computer, to permit the resources to be remotely accessible by the computer through a second network port.

22. A non-transitory computer readable medium, storing computer readable instructions that, when executed at a hardware processor of an access control device, cause the access control device to perform an access control method to provide a secure access control mechanism for a system when the system is remotely accessed, the access control method comprising:

determining, by a back-end firewall of the access control device, remotely accessible resources in the system, wherein the access control device is connected between the system and a computer configured to remotely access the system;

determining, by a back-end firewall, resources remotely accessible by the computer, from among the remotely accessible resources in the system, according to remote access control policies, wherein the determining the resources remotely accessible by the computer includes receiving, by a back-end firewall, industrial protocol messages, the industrial protocol messages transferred in the system, and obtaining, by a back-end firewall, information about the remotely accessible resources in the system from the industrial protocol messages according to different industrial protocols, the information about the remotely accessible resources in the system including a hardware version, wherein the back-end firewall is configured to at least monitor the industrial protocol messages periodically broadcast by the remotely accessible resources to obtain the hardware version of the respective remotely accessible resources; and providing, for the computer by a bastion host of the access control device through a first network port of a front-end firewall, information about the resources remotely accessible by the computer, to permit the resources to be remotely accessible by the computer, wherein the bastion host is connected with the front-end firewall and the back-end firewall is connected with the bastion host and the system through a second network port.

* * * * *